May 7, 1929. M. C. CARBONARO Re. 17,287

AUTOMATIC RECORDING METER FOR LIQUIDS

Original Filed March 6, 1923 2 Sheets-Sheet 1

May 7, 1929. M. C. CARBONARO Re. 17,287

AUTOMATIC RECORDING METER FOR LIQUIDS

Original Filed March 6, 1923 2 Sheets-Sheet 2

Inventor
Marius C. Carbonaro

By Sturtevant & Mason
Attorneys

Reissued May 7, 1929. Re. 17,287

UNITED STATES PATENT OFFICE.

MARIUS CLEMENT CARBONARO, OF PARIS, FRANCE, ASSIGNOR TO SOCIETE HARDOLL, OF PARIS, FRANCE.

AUTOMATIC RECORDING METER FOR LIQUIDS.

Original No. 1,612,488, dated December 28, 1926, Serial No. 623,140, filed March 6, 1923, and in France March 10, 1922. Application for reissue filed May 28, 1927, Serial No. 195,132.

The invention relates to new and useful improvements in measuring devices used in connection with automatic recording meters for all kinds of liquids.

An object of the invention is to provide a measuring device of the above type having two measuring chambers of given capacity, and a reversing valve mechanism for controlling the flow of the liquid alternately to and from said chambers, with means normally inactive for shifting the valves, and with means controlled by the pressure on the liquid in said measuring chambers for initiating the movement of said valves by said actuating means.

In the drawings which show by way of illustration one embodiment of the invention—

Figure 1:
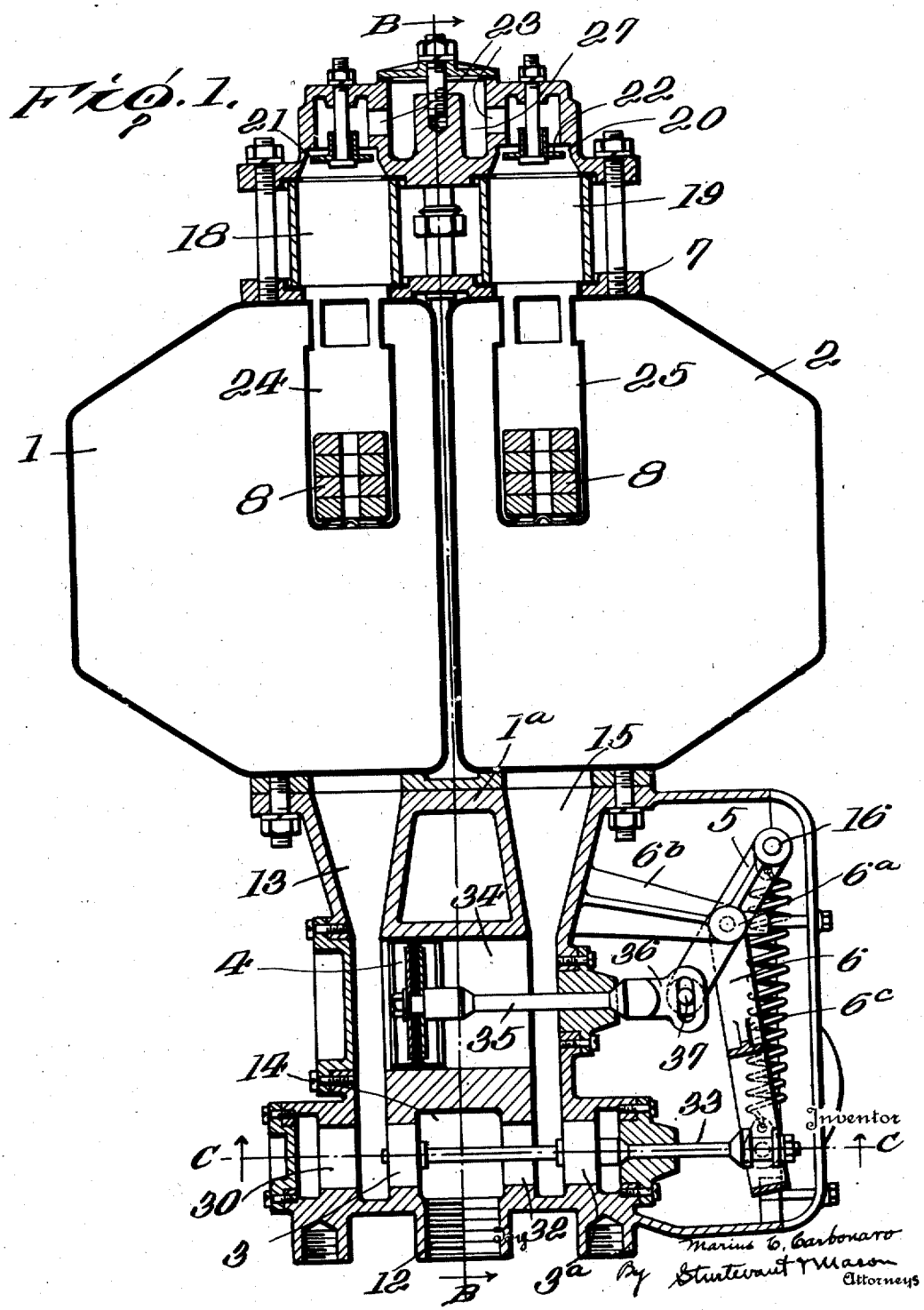
Figure 1 is a section on the line A—A of Fig. 2, through the measuring chambers and the controlling valve mechanism therefor.

The invention is directed broadly to a mechanism for measuring liquids, which is adapted to be used in connection with a recording meter. There are two independent measuring chambers of a given capacity. There is a feed pipe for delivering liquid to said chambers and an exhaust pipe for discharging the liquid from said chambers. These two pipes are common to both chambers and between the pipes and the chambers is a reversing valve mechanism for controlling the flow of the liquid through said pipes. Associated with this reversing valve mechanism is an actuating means therefor, which is normally inactive and which operates to shift the valves and connect said chambers alternately with the supply and exhaust pipes. There is also means controlled by the pressure on the liquid in said measuring chambers for initiating the movement of said valves by said actuating means. Thus it is that the valves are actually moved by the actuating means which is of sufficient strength to move the valves very quickly when thrown into operation and this actuating means is normally inactive. When a chamber is full, the pressure on the liquid in the chamber operates a controlling means which initiates or starts the actuating means for the valves.

Referring more in detail to the drawings, my improved measuring device includes two chambers 1 and 2, which are mounted on a suitable framework, indicated at 1[a] in the drawings, but which are entirely independent of each other. Mounted above the chambers 1 and 2 are two glass tubes 18 and 19 which are associated, respectively, with said chambers. These glass tubes form sights. Said tubes are held against a lower bridge piece 7 soldered on the metal forming the chambers by means of a cap 20, in which cap are arranged valves 21 and 22 of very small lift and apertures, such as at 23, which allow the air forced out by one of the reservoirs during filling to flow into the adjacent reservoir which is at this moment being discharged. Washers 8 may be retained in baskets 24 and 25 opening at the lower part and having bearing slots in the upper part, which washers by their number and volume enable a precise and definite volumetric regulation of the two measuring chambers 1 and 2 to be effected.

Figure 2:
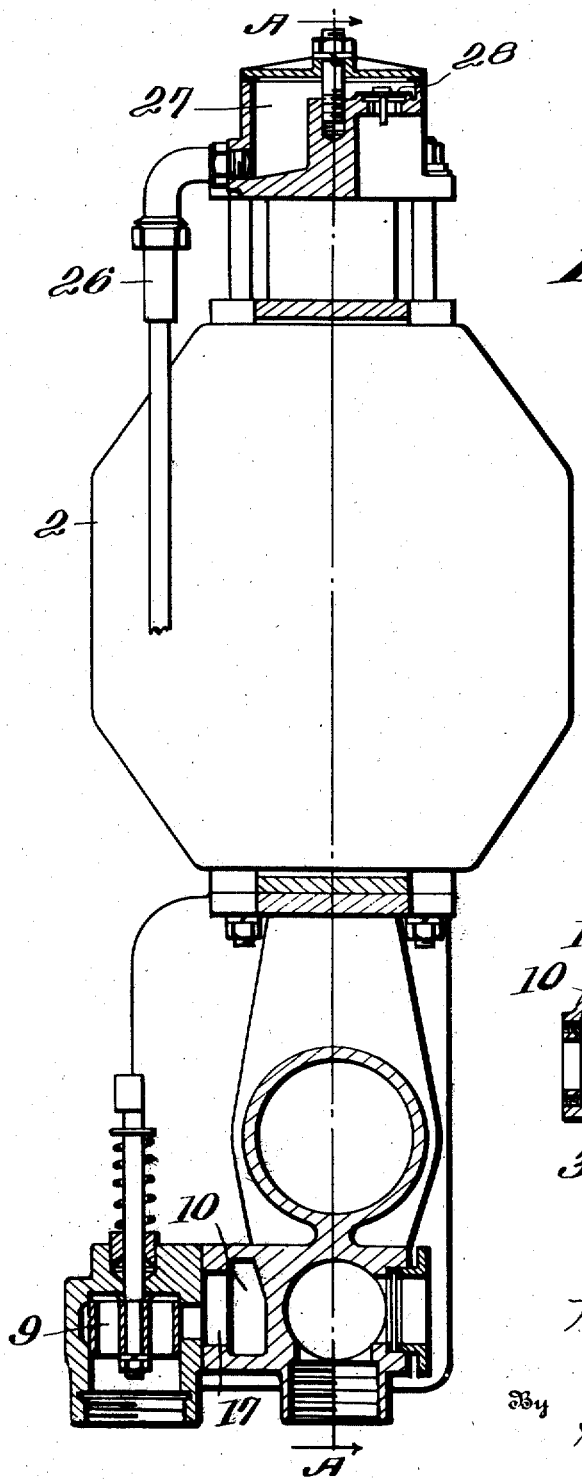
Fig. 2 is a sectional view on the line B—B of Fig. 1, showing only the frame structure.
Figure 3:
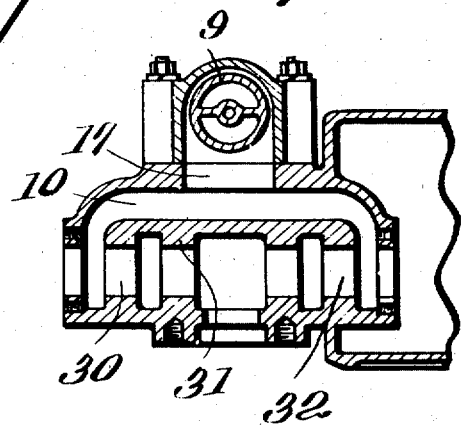
Fig. 3 is a sectional view on the line C—C of Fig. 1 with the valve mechanism removed.

The valves 21 and 22 are closed by the liquid when the chambers are filled. Any small quantity of liquid thrown out at the moment of release through the seats of the valves 21 and 22 and the hole 23 is collected in a chamber 27 and the overflow pipe 26 provides for the recovery of this liquid. It is excluded, however, from the measuring chamber and is not delivered with the contents of the chamber. A small air admission valve 28 (see Fig. 2) allows external air to enter the chamber 27 and thus to pass into the measuring chambers, so as to provide for the emptying of both chambers when drawing off the liquid. The liquid is drawn off through an exhaust pipe attached to the opening in the frame at 12. There is a discharge port 13, connected with the chamber 1, and this discharge port 13 extends down through the frame, and connects with a chamber 14 which leads to the opening 12 and the exhaust pipe connected therewith. There is also a discharge port 15 which connects with the chamber 2, and which also extends down through the frame and connects with the chamber 14. These ports 13 and 15 have been referred to as discharge ports and they are discharge ports when the chambers 1 and 2 are emptying. They are also filling ports when these chambers are being filled. In other words, the lower end of the port 13 is connected to a cylindrical port 30 (see Figs. 1 and 3) which in turn is connected to the port 10. On the other side of the valve casing, indicated at 31 in Fig. 3, is a cylindrical port 32, which likewise connects with the port 10. This port 10 in turn connects with an opening 17 in the casing, which is connected to a receiving or filling pipe. The valve 9, shown in the drawings, is for the purpose of closing the filling pipe when it is desired to measure less than a full capacity of the measuring device. This is not a part of the present invention and further description thereof is not thought necessary.

The liquid flows into the chamber 1 through the port 30, and the port 13, and flows out of said chamber to the port 13 and chamber 14. A cylindrical valve 3, see Fig. 1, is adapted to fit into the cylindrical port 30, and close the ports leading to the filling pipe, or fit into the chamber on the other side of the lower end of the port 13, and close the outflow of the liquid from the chamber 1. Likewise, there is a cylindrical valve $3^a$ which fits in the cylindrical port 32 and prevents the inflow to the chamber 2, and likewise fits in a cylindrical opening at the lower end of the port 15 which leads to the chamber 14 and prevents the outflow through the pipe 12. These two valves 3 and $3^a$ are mounted on the same stem, indicated at 33 in the drawings. When said stem is reciprocated the valves may be moved from a position where they cut off the filling of one chamber to a position where they will cut off the filling of the other chamber, and during this movement, when they cut off a chamber from the filling pipe, they open said chamber to the exhaust pipe. The valve stem 33 is connected to the lower end of a lever 6, see Fig. 1, which is pivotally mounted at $6^a$, on a bracket $6^b$, carried by the frame of the measuring apparatus. There is a second lever 5, preferably mounted on the same pivotal support $6^a$. A spring $6^c$ is pivotally connected at its lower end to the lever 6, adjacent its connection with the valve stem 33, and is connected at its upper end at 16 to the upper end of the lever 5.

Between the ports 13 and 15 the frame of the apparatus is provided with a cylindrical recess 34. Located in this recess is a reversing piston 4. Said reversing piston is carried by a stem 35 extending out through the wall in the casing and said stem is connected to the lower end of the lever 5. The stem has an enlarged head 36, with a vertical slot in which the pin 37, carried by the lower end of the lever 5, engages. The ports, as shown in Fig. 1, are so positioned that the chamber 1 is filled with liquid from the supply pipe. When the chamber is entirely filled, the valve 21 will be closed by the liquid. It is understood, of course, that the liquid is forced into the chamber, and therefore, the liquid will be put under a certain pressure when the chamber closes and is entirely filled. This pressure on the liquid will be transferred to the piston 4 and will move said piston to the right, as viewed in Fig. 1. Such a movement of the piston 4 will cause the lower end of the lever 5 to move to the other side of the pivot $6^a$—that is, take an angular position, which is just the reverse of that shown in Fig. 1. As soon as this lever is on the other side of the fulcrum pivot $6^a$, the spring is positioned so as to pull on the lower end of the lever 6 with a pull which tends to swing the lever 6 to the left, as viewed in Fig. 1, and this will shift the valves 3 and $3^a$ on to the other valve seats. While this chamber 1 is being filled the chamber 2 is emptying as the port 32 is open. The shifting of the valve stem, however, through the actuation of the spring will connect the chamber 1 with the exhaust pipe and will at the same time connect the chamber 2 to the filling pipe, so it is that these chambers are alternately connected with the filling and exhaust pipes. The spring moves the valve and is an actuating mechanism for accomplishing this purpose. This spring, or actuating mechanism formed thereby, is normally inactive, however. That is, when the parts are in the position shown in Fig. 1, the spring is on the right of the pivot pin $6^a$, and therefore, the lever 6 cannot be further moved thereby. It has reached the extreme of its movement to the right. The actuating mechanism will stay thus inactive until this piston 4 moves the lever 5, so as to carry the upper end thereof to the other side of the pivotal support $6^a$. Then it is that the spring is so positioned as to move the valve in the opposite direction.

It will be noted, therefore, that I have here a reversing valve mechanism wherein the valve is moved by an actuating mechanism, including a spring, which is normally inactive, and the movement of this spring is initiated by the piston 4, which in turn is operated by the pressure on the liquid when the chamber is full. I have, therefore, an actuating mechanism ready to shift the valve, but which will not operate until the chamber is filled and enough pressure is put on to the liquid in the chamber to cause the controlling means to initiate the valve actuating mechanism.

While I have shown a reversing valve wherein the valves are mounted both on the same stem, it will be understood, of course, that this mechanism may be modified, the essential feature being that the controlling valves shall be simultaneously reversed so as to connect alternately the measuring chambers with the filling and the exhaust pipes, and that this valve mechanism shall be operated by an actuating means which is normally inactive, and wherein the controlling means is provided for initiating the movement of the reversing valves.

It is obvious that minor changes in the details of construction, and arrangement of parts may be made without departing from the spirit of the invention as set forth in the appended claims.

I declare that what I claim is:

1. In a meter apparatus for measuring liquids, the combination of two measuring chambers of given capacity, a framework supporting said chambers, each chamber having a vent and means for closing said vent after the chamber with which it is associated is filled with the liquid to be measured, said framework having passages through which the liquid to be measured is delivered under pressure to said chambers, and having passages through which the measured quantity of liquid is discharged, a four-way reversing valve for controlling the supply to and the discharge from said chambers, actuating means normally inactive for shifting said four-way valve so as to connect said chambers alternately with the supply and discharge means, and means controlled by the pressure developing on the liquid in the measuring chamber after it is completely full of the liquid to be measured for initiating the movement of said actuating means for shifting said four-way valve.

2. In a meter apparatus for measuring liquids, the combination of two measuring chambers of given capacity, a framework supporting said chambers, each chamber having a vent and means for closing said vent after the chamber with which it is associated is filled with the liquid to be measured, said framework having passages through which the liquid to be measured is delivered under pressure to said chambers, and having passages through which the measured quantity of liquid is discharged, a four-way reversing valve for controlling the supply to and the discharge from said chambers, a single spring actuating means normally inactive for shifting said four-way valve so as to connect said chambers alternately with the supply and discharge means, and means controlled by the pressure developing on the liquid in the measuring chamber after it is completely full of the liquid to be measured for initiating the movement of said actuating means for shifting said four-way valve.

3. In a meter apparatus for measuring liquids, the combination of two measuring chambers of given capacity, a framework supporting said chambers, each chamber having a vent and means for closing said vent after the chamber with which it is associated is filled with the liquid to be measured, said framework having passages through which the liquid to be measured is delivered under pressure to said chambers, and having passages through which the measured quantity of liquid is discharged, a sliding four-way valve for controlling the supply to and the discharge from said chambers, said valve being of such dimensions relative to said passages as to prevent the direct connecting of the supply passages with the discharge passages, actuating means normally inactive for shifting said four-way valve so as to connect said chambers alternately with the supply and discharge passages, and means controlled by the pressure developing on the liquid in the measuring chamber after it is completely full of the liquid to be measured for initiating the movement of the actuating means for shifting the valve.

4. In a meter apparatus for measuring liquids, the combination of two measuring chambers of given capacity, a framework supporting said chambers, each chamber having a vent and means for closing said vent after the chamber with which it is associated is filled with the liquid to be measured, said framework having passages through which the liquid to be measured is delivered under pressure to said chambers, and having passages through which the measured quantity of liquid is discharged, a sliding four-way valve for controlling the supply to and the discharge from said chambers, said valve being of such dimensions relative to said passages as to prevent the direct connecting of the supply passages with the discharge passages, actuating means normally inactive for shifting said four-way valve so as to connect said chambers alternately with the supply and discharge passages, a piston, a cylinder for said piston, said cylinder having its respective ends connected to said chambers so that the piston is moved in one direction by the pressure developing on the liquid in one of said measuring chambers after it is full, and is moved in the opposite direction by the pressure developing on the liquid in the other measuring chamber after it is full, said piston as it is shifted operating to initiate the movement of said actuating means for said four-way valve.

5. In a meter apparatus for measuring liquids, the combination of two measuring chambers of given capacity, a framework supporting said chambers, said framework having passages through which the liquid to be measured is delivered under pressure to said measuring chambers, and having passages through which the measured quantity of liquid is discharged, a reciprocating valve for controlling the supply to and the discharge from said chambers, spring means normally inactive for actuating said reciprocating valve so as to connect said chambers alternately with the supply and discharge passages, said valve being of such dimensions relative to said passages as to prevent the direct connection of the supply passages to the discharge passages for said chambers, and means controlled by the pressure developing on the liquid in the measuring chamber after it is supplied with the liquid to be measured for initiating the movement of said spring means for actuating the valve.

6. In a meter apparatus for measuring liquids, the combination of two measuring chambers of given capacity, a framework supporting said chambers, said framework having passages through which the liquid to be measured is delivered under pressure to said measuring chambers, and having passages through which the measured quantity of liquid is discharged, a reciprocating valve for controlling the supply to and the discharge from said chambers, spring means normally inactive for actuating said reciprocating valve so as to connect said chambers alternately with the supply and discharge passages, said valve being of such dimensions relative to said passages as to prevent the direct connection of the supply passages to the discharge passages for said chambers, a piston, a cylinder for the piston located between said measuring chambers, said piston having its opposite faces alternately subjected to the pressure developing on the liquid to be measured in said chambers after said chambers are full, said piston, when moved in one direction, initiating the spring means for shifting the valve mechanism in one direction, and when moved in the other direction, again initiating the spring means for moving the valve mechanism in the opposite direction, whereby said measuring chambers are alternately and automatically filled and discharged.

7. In a meter apparatus for measuring liquids, the combination of two measuring chambers of given capacity, a framework supporting said chambers, said framework having passages through which the liquid to be measured is delivered under pressure to said chambers, and passages through which a measured quantity of liquid is discharged, a reciprocating four-way valve for controlling the supply to and the discharge from said chambers, a lever connected to said four-way valve for shifting the same, a piston, a cylinder for said piston disposed relative to said measuring chambers so that the piston is moved alternately in one direction and then the other by the pressure developing on the liquid in the respective measuring chambers after they are completely full of the liquid to be measured, a rod connected to said piston and movable therewith, a lever connected to said rod, a spring connecting said levers, said levers and spring being so disposed that on the first movement of the piston in one direction, power is stored in said spring, and when said piston continues its movement, said spring will be carried by a dead center point and will actuate said lever for shifting the valve.

8. In a meter apparatus for measuring liquids, the combination of two measuring chambers of given capacity, a framework supporting said chambers, said framework having passages through which the liquid to be measured is delivered under pressure to said chambers, and passages through which a measured quantity of liquid is discharged, a reciprocating four-way valve for controlling the supply to and the discharge from said chambers, a lever connected to said four-way valve for shifting the same, a piston, a cylinder for said piston disposed relative to said measuring chambers so that the piston is moved alternately in one direction and then the other by the pressure developing on the liquid in the respective measuring chambers after they are completely full of the liquid to be measured, a rod connected to said piston and movable therewith, a lever connected to said rod, a spring connecting said levers, said levers and spring being so disposed that on the first movement of the piston in one direction, power is stored in said spring, and when said piston continues its movement, said spring will be carried by a dead center point and will actuate said lever for shifting the valve, said four-way valve being of such dimensions relative to the passages as to prevent the direct connecting of the supply passages with the discharge passages for said chambers.

9. In a meter apparatus for measuring liquids, the combination of two measuring chambers of given capacity, a framework having passages through which the liquid to be measured is delivered under pressure, and passages through which the measured quantity of liquid is discharged, a valve mechanism for controlling the flow of liquid through said passages, a piston, and a cylinder for said piston associated with said measuring chambers and so disposed that said piston is moved in one direction through the pressure on the liquid being measured when one chamber is full, and in the opposite direction when the other chamber is full, actuating means normally inactive for shifting said valve mechanism so as to connect said chambers alternately with the supply and discharge passages, and means operated by the shifting of the piston for initiating the movement of said actuating means.

10. In a meter apparatus for measuring liquids, the combination of two measuring chambers of given capacity, a framework having passages through which the liquid to be measured is delivered under pressure and passages through which the measured quantity of liquid is discharged, a four-way reversing valve mechanism for controlling the flow of liquid through said passages, a piston, and a cylinder for said piston associated with said measuring chambers and so disposed that said piston is moved in one direction through the pressure on the liquid being measured when one chamber is full, and in the opposite direction when the other chamber is full, actuating means normally inactive for shifting said valve mechanism so as to connect said chambers alternately with the supply and discharge passages, and means operated by the shifting of the piston for initiating the movement of said actuating means.

11. In a meter apparatus for measuring liquids, the combination of two measuring chambers of given capacity, a framework having passages through which the liquid to be measured is delivered under pressure and passages through which the measured quantity of liquid is discharged, a four-way reversing valve mechanism for controlling the flow of liquid through said passages, a piston, and a cylinder for said piston associated with said measuring chambers and so disposed that said piston is moved in one direction when one chamber is full and in the opposite direction when the other chamber is full, devices controlled by said piston for shifting said valve from one extreme position to another, said devices including a lever connected to said four-way valve, a lever connected to the piston, said levers having a common fulcrum, and a spring connecting said levers.

12. In a meter apparatus for measuring liquids, the combination of two measuring chambers of given capacity, a framework supporting said chambers, each chamber having a vent, and means for closing the vent when the chamber with which it is associated is filled with the liquid to be measured, said framework having passages through which the liquid to be measured is delivered under pressure and having passages through which a measured quantity of the liquid is discharged, a valve means for controlling the supply to and the discharge from said chambers, said valve means being of such dimensions relative to the passages as to prevent at all times the connection of the supply passages directly to the discharge passages, actuating means normally inactive for operating said valve means so as to connect said chambers alternately with the supply and discharge passages, and means controlled by the pressure developing on the liquid in the measuring chamber after the vent for said chamber is closed for initiating the movement of said actuating means for operating the valve mechanism.

13. In a meter apparatus for measuring liquids, the combination of two measuring chambers of given capacity, a framework supporting said chambers, each chamber having a vent, and means for closing the vent when the chamber with which it is associated is filled with the liquid to be measured, said framework having passages through which the measured quantity of the liquid is discharged, a valve means for controlling the supply to and the discharge from said chambers, said valve means being of such dimensions relative to the passages as to prevent at all times the connection of the supply passages directly to the discharge passages, actuating means normally inactive for operating said valve means so as to connect said chambers alternately with the supply and discharge passages, and means actuated by the liquid in the measuring chamber through the pressure developing thereon after the vent for said chamber is closed for initiating the movement of said actuating means for operating the valve means.

14. In a meter apparatus for measuring liquids, the combination of two measuring chambers of given capacity, a framework associated with said chambers, each chamber having a vent, an interconnecting passage between said vents allowing communication between the chambers when the vents are open, an auxiliary air inlet valve connected with said passages, means for closing each of said vents when the chamber with which it is associated is supplied with the liquid to be measured, said framework having passages leading to said measuring chambers through which the liquid to be measured is delivered under pressure, and passages through which the measured liquid is discharged, valve means for controlling the supply to and the discharge from said chambers, said valve means being of proportions relative to said passages as to prevent at all times the connecting of the supply passages directly to the discharge passages, actuating means normally inactive for operating said valve means so as to connect said chambers alternately with the supply and discharge passages, and means controlled by the pressure developing on the liquid in the measuring chamber after the vent is closed for initiating the movement of said actuating means for operating said valve means.

15. In a meter apparatus for measuring liquids, the combination of two measuring chambers of given capacity, a framework associated with said chambers, each chamber having a vent and means for closing the vent after the chamber with which it is associated is supplied with the liquid to be measured, said framework having passages through which the liquid to be measured is delivered to the measuring chambers under pressure, and passages through which a measured quantity of liquid in the chambers is discharged, a single cylindrical rectilinearly reciprocating four-way valve for controlling the supply to and the discharge from said chambers, a single actuating means normally inactive for shifting the four-way valve so as to connect the chambers alternately with the supply and discharge passages, and means controlled by the pressure developing on the liquid in the measuring chamber after the vent is closed for initiating the movement of the actuating means for operating the valve.

16. In a meter apparatus for measuring liquids, the combination of two measuring chambers of given capacity, a framework for supporting said chambers, each chamber having a vent and means for closing the vent after the chamber with which it is associated is supplied with the liquid to be measured, said framework having passages through which the liquid to be measured is delivered to the measuring chambers under pressure, and passages through which the measured liquid in the chambers is discharged, a single cylindrical rectilinearly reciprocating four-way valve for controlling the supply to and the discharge from said chambers, a spring actuating means normally inactive for shifting the four-way valve so as to connect the chambers alternately with the supply and discharge passages, and means controlled by the pressure developing on the liquid in the measuring chamber after the vent is closed for initiating the movement of the actuating means for operating the valve.

17. In a meter apparatus for measuring liquids, the combination of two measuring chambers of given capacity, a framework for supporting said chambers, each chamber having a vent, means for closing the vent after the chamber with which it is associated is supplied with the liquid to be measured, said framework having passages through which the liquid to be measured is delivered under pressure to said measuring chambers, a passage through which the measured liquid is discharged, a single valve for controlling the supply to and the discharge from said chambers, actuating means normally inactive for shifting said valve so as to connect said chambers alternately with the supply and discharge passages, and means controlled by the pressure developing on the liquid in the measuring chamber after the vent is closed for initiating the movement of the actuating means for operating the valve.

18. In a meter apparatus for measuring liquids, the combination of two measuring chambers of given capacity, a framework associated with said chambers, each chamber having a vent and means for closing said vent after the chamber with which it is associated is completely filled with the liquid to be measured, said framework having passages through which the liquid to be measured is delivered under pressure to said chambers, and having passages through which the measured quantity of liquid is discharged, a valve mechanism for controlling the supply to and the discharge from said chambers, including devices whereby the chamber to be filled is connected with the supply after the discharge passage for said chamber has been closed and the chamber to be emptied is connected to the discharge passage therefor after the connection to the supply has been closed, and means for utilizing the pressure developing on the liquid after the measuring chamber is full of the liquid to be measured for operating said devices.

19. In a meter apparatus for measuring liquids, the combination of two measuring chambers of given capacity, a framework associated with said chambers, each chamber having a vent, and means whereby the liquid flowing into the measuring chamber closes said vent after all the air or vapor in the chamber has escaped through the vent and the chamber is filled with the liquid to be measured, said framework having passages through which the liquid to be measured is delivered under pressure to said chambers, and having passages through which the measured quantity of liquid is discharged, a valve mechanism for controlling the supply to and the discharge from said measuring chambers including devices and actuating means therefor whereby the chamber to be filled is connected with the supply after the discharge passage for said chamber has been closed and the chamber to be emptied is connected to the discharge passage therefor after the connection to the supply has been closed, said actuating mechanism being normally inactive, and means whereby the pressure developing on the liquid in the measuring chamber after it is full of the liquid to be measured initiates the movement of said actuating means.

In testimony whereof, I affix my signature.

MARIUS CLEMENT CARBONARO.